United States Patent [19]

Takahashi

[11] Patent Number: 4,641,345
[45] Date of Patent: Feb. 3, 1987

[54] BODY-SENSIBLE ACOUSTIC DEVICE

[75] Inventor: Yoshio Takahashi, Saitama, Japan

[73] Assignee: Pioneer Electronic Corporation, Tokyo, Japan

[21] Appl. No.: 686,965

[22] Filed: Dec. 28, 1984

[30] Foreign Application Priority Data

Dec. 29, 1983 [JP] Japan ................. 58-203576
Dec. 29, 1983 [JP] Japan ................. 58-203582
Dec. 29, 1983 [JP] Japan ................. 58-203588
Dec. 29, 1983 [JP] Japan ................. 58-203592

[51] Int. Cl.⁴ ............................................ H04M 1/04
[52] U.S. Cl. ..................................... 381/86; 381/152
[58] Field of Search .............. 179/146 H, 149–151, 179/146 R; 381/86; 128/33

[56] References Cited

U.S. PATENT DOCUMENTS

| | | | |
|---|---|---|---|
| 3,384,719 | 5/1968 | Lanzara | 179/146 H |
| 3,455,296 | 7/1969 | McCaleb | 128/33 |
| 3,503,389 | 3/1970 | McKee | 128/33 |
| 3,512,605 | 5/1970 | McCorkle | 179/146 H |
| 3,556,088 | 1/1971 | Leonardini | 128/33 |
| 4,038,499 | 7/1977 | Yeaple | 179/146 H |
| 4,064,376 | 12/1977 | Yamada | 179/146 H |
| 4,075,438 | 2/1978 | Kappel | 179/146 H |
| 4,156,117 | 5/1979 | Phillips | 179/146 H |
| 4,210,784 | 7/1980 | Phillips | 179/146 H |
| 4,354,067 | 10/1982 | Yamada | 179/146 H |

FOREIGN PATENT DOCUMENTS

| | | | |
|---|---|---|---|
| 55-3233 | 1/1980 | Japan | 179/146 H |
| 56-72600 | 6/1981 | Japan | 381/86 |

OTHER PUBLICATIONS

Jacobs, E., "What's New", *Popular Science*, Nov. 1979, p. 97.

Primary Examiner—Gene Z. Rubinson
Assistant Examiner—L. C. Schroeder
Attorney, Agent, or Firm—Sughrue, Mion, Zinn, Macpeak and Seas

[57] ABSTRACT

A body-sensible acoustic device which can be readily mounted on and detached from a seat of an automobile. A drive unit driven by acousto-electrical signals is mounted on a vibration transmitting member. A pair of clamping members are provided which are coupled to the vibration transmitting member in such a manner as to be slidable with respect thereto and swingable in a plane including the vibration transmitting member. Each clamping member has an arm for a holding a side frame provided in the seat body.

8 Claims, 34 Drawing Figures

BODY-SENSIBLE ACOUSTIC DEVICE

BACKGROUND OF THE INVENTION

The present invention relates to a body-sensible acoustic device which can be used with a chair or seat such as an automobile seat.

In general, in an automobile, low-frequency sounds, being masked by road noise, engine sounds and other types of vibration, cannot be heard sufficiently, and accordingly music played in such an environment may not be as vivid as heard in other places. This drawback may be alleviated somewhat by using a graphic equalizer or a so-called super-woofer. However, the low-frequency sounds are unavoidably still not rich and clear. Moreover, if the volume is turned up sufficiently for passengers in the rear seat, the driver may not able to hear external sounds adequately and thus cannot drive the automobile safely.

In view of the foregoing, recently it has been proposed to mount a body-sensible acoustic device in a seat. The device is used to vibrate the seat body in response to low-frequency components of a musical signal. In this case, the vibration of the seat body is transmitted directly (not through the air) to the listener's body. Therefore, the sound waves transmitted through the ears and the vibration waves transmitted directly to the body are mixed so that the listener can perceive considerably impressive extremely low-frequency sounds using his whole body.

Most body-sensible acoustic devices of this type proposed to date had to be an integral part of the seat and could not be installed on an existing seat. One body-sensible acoustic device is available which is intended to be fixedly secured inside the back of an automotive seat. However, to install this body-sensible acoustic device, it is necessary to remove the seat cover or remove the seat body itself from the automobile. Thus, the installation of the device is considerably troublesome.

SUMMARY OF THE INVENTION

In view of the foregoing, an object of the present invention is to provide a body-sensible acoustic device which can be readily mounted on the body of an automobile seat and easily removed therefrom.

The above, as well as other objects of the present invention, are met by a body-sensible acoustic device comprising a drive unit driven by acousto-electrical signals, a vibration transmitting member on which the drive unit is mounted, and a pair of clamping members coupled to the vibration transmitting member in such a manner as to be slidable with respect thereto and swingable in a plane including the vibration transmitting member. Each clamping member has an arm for holding a side frame provided on the body of the seat.

Further, the above another objects of the invention are met by a body-sensible acoustic device comprising a drive unit driven by acousto-electrical signals, a vibration transmitting member on which the driven unit is mounted, and clamping members adapted to detachably mount the vibration transmitting member on side frames of the back of a seat body of an automobile seat.

Still further, the invention can be practiced by a body-sensible acoustic device comprising a vibration transmitting member detachably mounted on legs of a head rest which are fixedly inserted into a frame provided in a back of a seat body with the vibration transmitting member having arms extending along an upper surface of the back, a drive unit mounted on the vibration transmitting member which is driven by acousto-electrical signals, and a plurality of acoustical elements including a control section for the drive unit and a tape recorder mounted on the arms of the vibration transmitting member, and a pair of loudspeaker units mounted on the arms of the vibration transmitting member in such a manner that the loudspeaker units are located on both sides of the head rest.

Otherwise, the invention may be implemented with a body-sensible acoustic device comprising a planar drive unit including a drive unit driven by acousto-electrical signals and a vibration transmitting member pressed against a rear side of a back of a seat on which the drive unit is mounted, and clamping members on which the planar drive unit is mounted through an elastic member, made of rubber or the like, and which are detachably mounted on side frames of the back.

DESCRIPTION OF THE PREFERRED EMBODIMENTS

Preferred embodiments of the invention will be described in detail with reference to the accompanying drawings.

Figure 1:
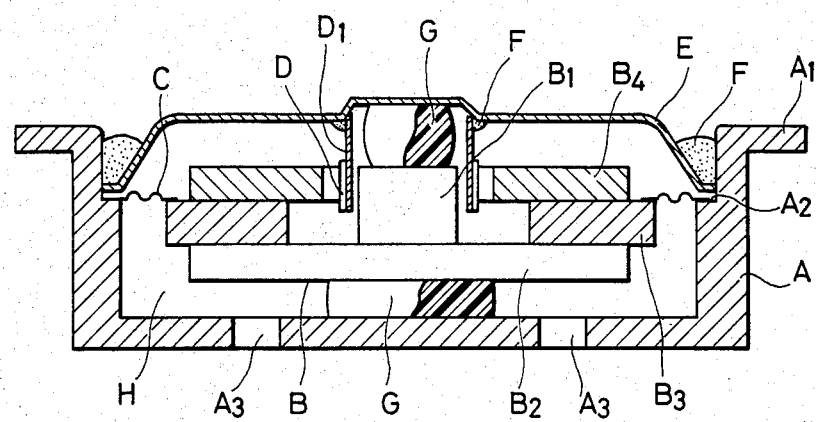
FIG. 1 is a sectional view showing an example of a drive unit in a body-sensible acoustic device according to the invention.

FIG. 1 shows a drive unit 1, which is a fundamental components of a body-sensible acoustic device according to the invention. In FIG. 1, reference character A designates a cup-shaped frame which has a flange $A_1$ along the edge of its opening. A step $A_2$ is formed in the inner surface of the cylindrical wall of the cup-shaped frame.

A magnetic circuit B is arranged in the frame A. The magnetic circuit B has a peripheral part supported through a damper C by the step $A_2$ of the frame A. An annular magnet $B_3$ is mounted on a yoke $B_2$ having a center pole $B_1$. A top plate $B_4$ is fixedly secured to the magnet $B_3$ as shown in FIG. 1.

A voice coil D wound on a bobbin $D_1$ is disposed in the air gap which is formed in the magnetic circuit B. The bobbin $D_1$ is fixedly secured to a holder plate E at one end. The holder plate E is inserted in the cup-shaped frame A in such a manner as to close the opening of the frame A. More specifically, the peripheral portion of the holder plate E is fixedly bonded to the outer periphery of the damper C with adhesive F.

The space which is defined by the center pole $B_1$ and the holder plate E and the surrounded by the bobbin $D_1$ is filled with damping material G, which may be a rubber material, a sponge material such as polyurethane foam material, a viscous material, or a felt material.

The space between the frame A and the yoke $B_2$ is also filled with the damping material G to damp the vibrations of the magnetic circuit B. The space surrounded by the frame A, the magnetic circuit B and the damper C is an air chamber H, which is communicated with the atmosphere via through-holes $A_3$ formed in the bottom of the cup-shaped frame A. The flange $A_1$ of the frame A is mounted on a vibration transmitting member (described below).

When a sound signal is applied to the voice coil D, the magnetic interaction between the magnetic force produced in the voice coil D and the magnetic force in the magnetic gap causes the frame A and the magnetic circuit B to move relative to each other, thus generating a body-sensible vibration. This vibration is transmitted from the frame A to the vibration transmitting member. The vibration thus transmitted is further transmitted through the seat body to the person occupying the seat.

An electrical circuit for driving the above-described drive unit 1 will be described with reference to FIGS. 2 and 3A.

Figure 2:
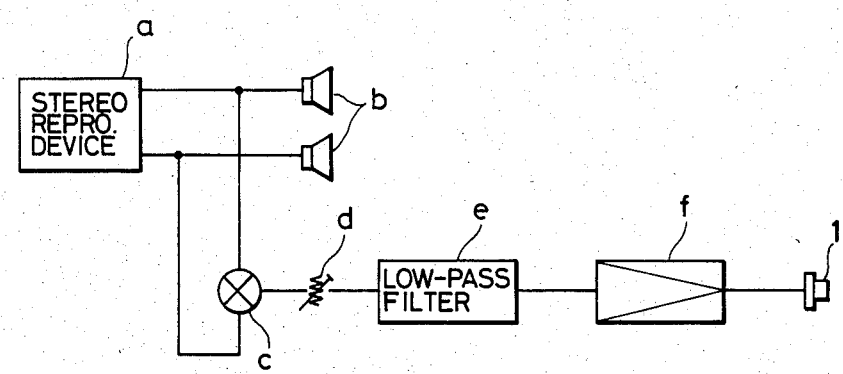
FIGS. 2, 3A and 3B are block diagrams and a characteristic diagram used for a description of examples of a circuit used to drive the drive unit shown in FIG. 1.

In FIG. 2, reference character a designates a stereo reproducing device; b, right- and left-channel loudspeakers which are driven by the output of the stereo reproducing device; c, a mixer for mixing the right and left output signals of the stereo reproducing device; d, a variable resistor for adjusting the level of the output signal of the mixer; e, a low-pass filter for removing high-frequency components from the output of the variable resistor d thereby to transmit only low-frequency components; and f, an extremely low-frequency signal reproducing output amplifier.

In the circuit thus constructed, the right and left output signals of the stereo reproducing device a are mixed by the mixer c and subjected to level adjustment by the variable resistor d. The signals thus processed are applied to the low-pass filter e. As a result, only the signals in the extremely low frequency range are outputted by the low-pass filter e and amplified by the output amplifier f to drive the drive unit 1.

Figure 3A:
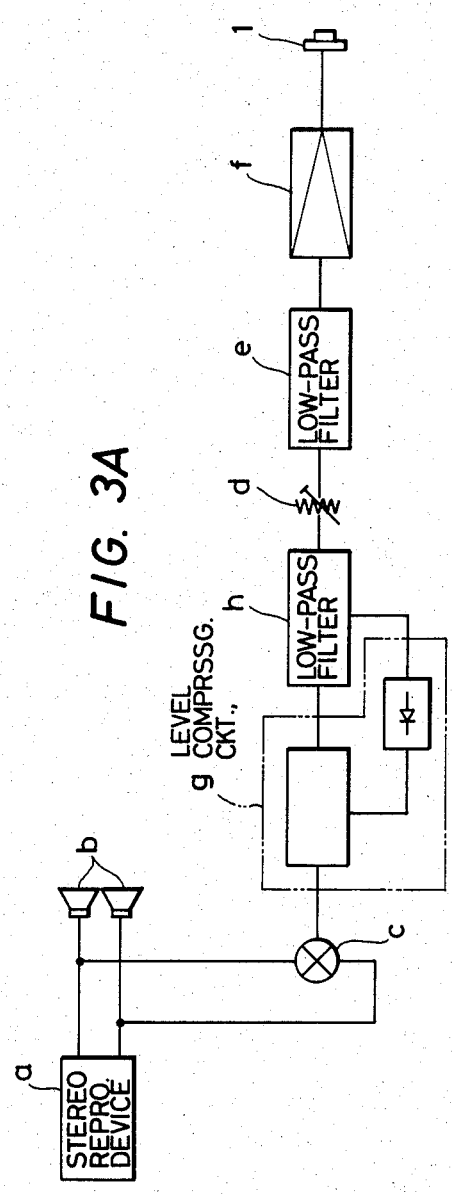

The circuit shown in FIG. 3A is formed by connecting a level compressing circuit g and a first low-pass filter h between the mixer c and the variable resister d in the circuit of FIG. 2. The circuit of FIG. 3A is the same as that of FIG. 2 except for the following: In the circuit of FIG. 3A, a reproduction signal outputted by the mixer c is controlled to a suitable level by the level compressing circuit g so that the drive unit 1 is protected from damage due to a large output.

Figure 3B:
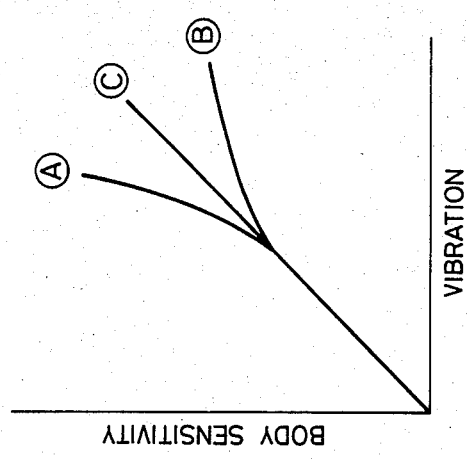
Figure 4:
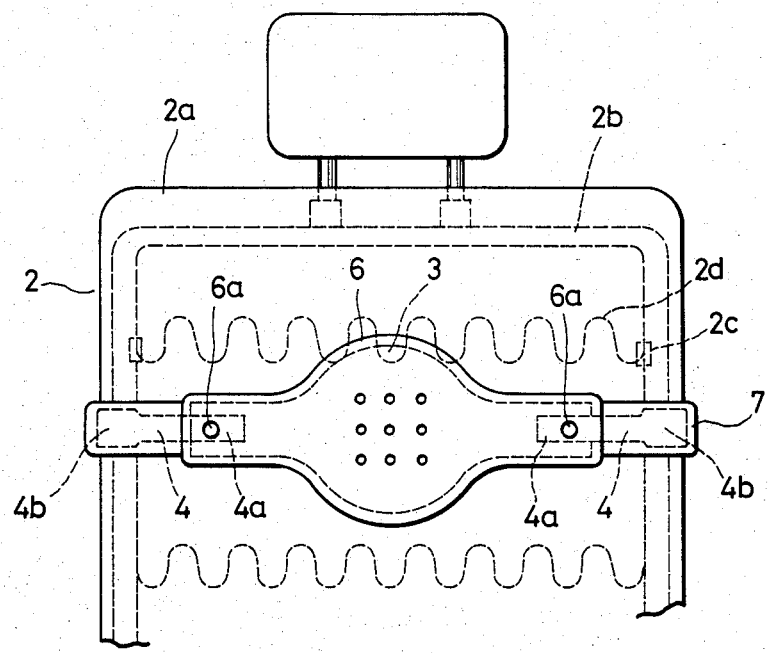
FIG. 4 is a front view of the body-sensible acoustic device mounted on the back of a seat body.
Figure 5:
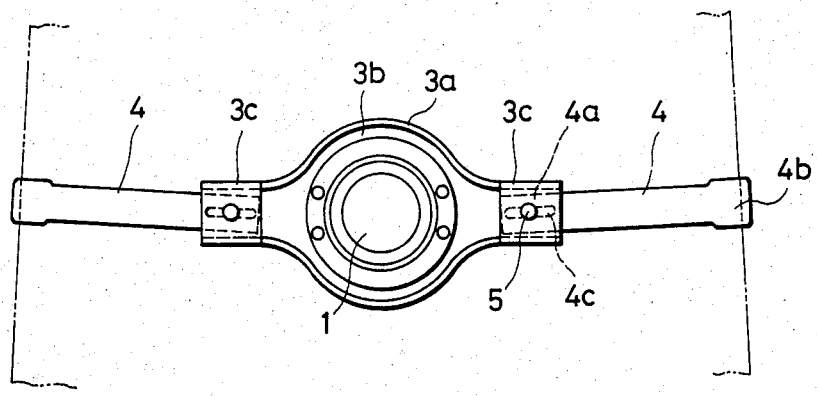
FIG. 5 is a rear view of the device shown in FIG. 4.

The characteristic curve of vibration and body sensibility is as indicated at (A) in FIG. 3B; that is, as the vibration increases, the body feel it abruptly. Therefore, it is necessary to change the curve (A) into the curve (B) using a compressing circuit to allow the body to perceive it linearly as indicated by the curve (C). The first low-pass filter h is used to remove high-frequency components, and the second low-pass filter e is employed to remove the remaining unwanted high-frequency components. The other functions of the circuit are the same as those of the circuit in FIG. 2.

The body-sensible acoustic device which is constructed by mounting the drive unit 1, which is driven by the above-described circuit, on the back an automotive seat body will be described with reference to FIGS. 4 through 7.

In these figures, reference numeral designates a seat body made up of a lower cushion (not shown) and a seat back which can be freely folded. A side frame 2b swingably coupled to the frame of the seat is provided in the back 2a. Wavy springs 2d are connected under tension between the right and left members of the side frame 2b with fittings 2c. The side frame 2b and the springs 2d are covered with cushion material and a cover of cloth or the like.

Figure 6:
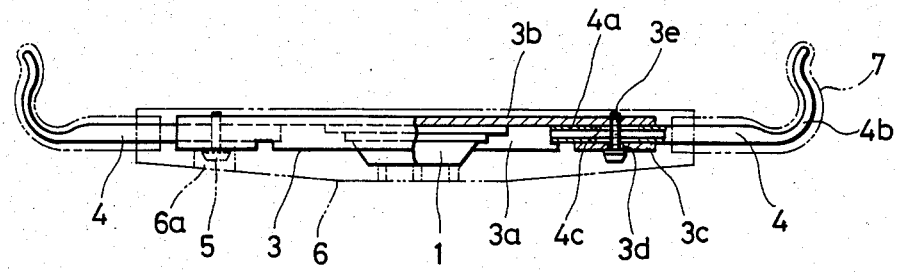
FIG. 6 is a plan view, with parts cut away, of the device shown in FIG. 4.

Reference numeral 3 designates the aforementioned vibration transmitting member, which includes a disk part 3b with reinforcing ribs 3a and two holding parts 3c extending from the disk part 3b to the right and left. Each holding part is in the form of a flattened cylinder. The drive unit 1 is secured to the disk part 3b with screws. Reference numeral 4 designates a pair of clamping members. Each clamping member is in the form of a flattened pipe. The base end portions 4a of the clamping member 4 are inserted into the respective holding parts 3c of the vibration transmitting member 3. The outer end portions of the clamping members 4 are bent to form arms 4b which are used to hold the side frame 2b of the back 2a of the chair 2. More specifically, the arms 4b are curved as shown in FIG. 6 so as to hold the side frame 2b. A threaded hole 3d is formed in the rear side of each holding part 3c, and a screw inserting hole 3e is formed in the front side. An elongated hole 4c is formed in the base end portion 4a of each clamping member 4. A screw 5 is screwed through the screw inserting hole 3e and the elongated hole 4c into the threaded hole 3d.

Reference numeral 6 designates an elastic protective member which covers the vibration transmitting member 3, and reference numeral 7 designates elastic protective members which cover the portions of the clamping members which are outsid the vibration transmitting member 3. These protective members are intended also to protect persons in the rear seat and to improve the external appearance of the device. The protective members 6 have holes 6a for adjusting the screws 5.

The base end portion 4a of each clamping member 4 is loosely inserted into the holding part 3c of the vibration transmitting member 3 so that it can swing about the screw 5.

A method of mounting the above-described body-sensible acousting device on the rear side of the back 2a of the seat will be described.

Figure 7:
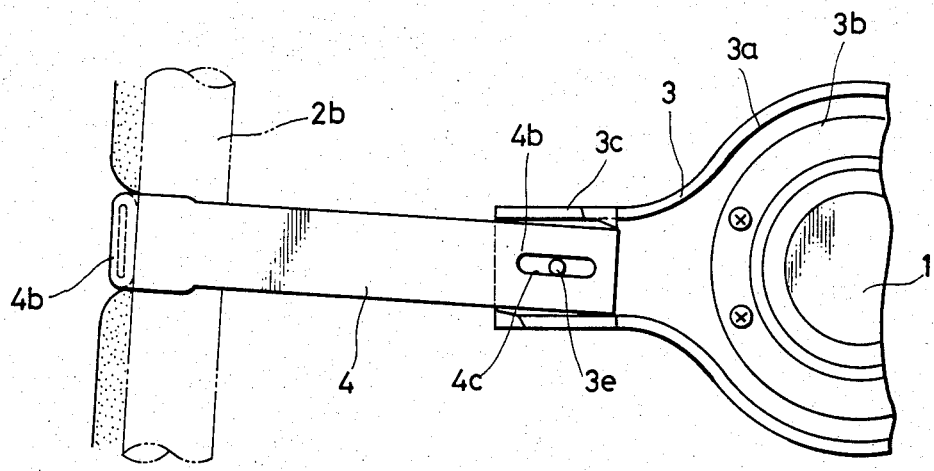
FIG. 7 is an enlarged rear view showing essential components of the device in FIG. 4.

First, the screws 5 are loosened so that the clamping members 4 can freely move. Then, the clamping members 4 are pulled out of the holding parts 3c until the arms 4b can hold the right and left members of the side frame 2b. Under this condition, the clamping members 4 are pushed into the holding parts 3c and tightened with the screws 5 so that the arms 4b are fixedly secured to the right and left members of the side frame 2b. In the described embodiment, the clamping members 4 are swingable with respect to the vibration transmitting member 3 to some extent. Therefore, even if the right and left members of the side frame 2b are tapered upwardly, the arms 4b of the clamping members 4 can hold the right and left members of the side frame 2b through the cushion materials without gaps as shown in FIG. 7.

When the drive unit 1 is driven by acousto-electrical signals, the vibration of the drive unit 1 is transmitted through the vibration transmitting member 3 and the clamping members 4 to the side frame 2b of the back 2. Accordingly, the side frame 2b is vibrated and the wavy springs 2d are vibrated. Therefore, the back 2 is vibrated in its entirety so that extremely low-frequency sounds of the music are transmitted to the back of the person in the chair.

The body of each clamping member is flat and thin, and the remaining portion, namely, the arm 4b, is smaller in thickness than the body. Therefore, the arm has a large area to contact the side frame 2b. Accordingly, the vibration is satisfactorily transmitted and the arms can be positively secured to the side frame.

As is apparent from the above description, the right and left clamping members, before secured, are slidable and swingable with respect to the vibration transmitting member on which the drive unit is mounted, and the arms of the clamping members are fixedly secured to the side frame of the seat back. Accordingly, even if the right and left members of the side frame are not parallel, the arms can be fixedly secured to the right and left members of the side frame without gaps between the side frame and the arms, and the vibration of the drive unit is positively transmitted through the vibration transmitting member and the clamping members to the side frame so that the seat back is efficiently vibrated in its entirety and the listener's body can receive the extremely low-frequency sounds sufficiently. Furthermore, it should be noted that the device can be readily mounted on the seat.

A further embodiment of a device for mounting a drive unit 1 on the rear side of an automobile seat will be described with reference to FIG. 8.

Figure 8:
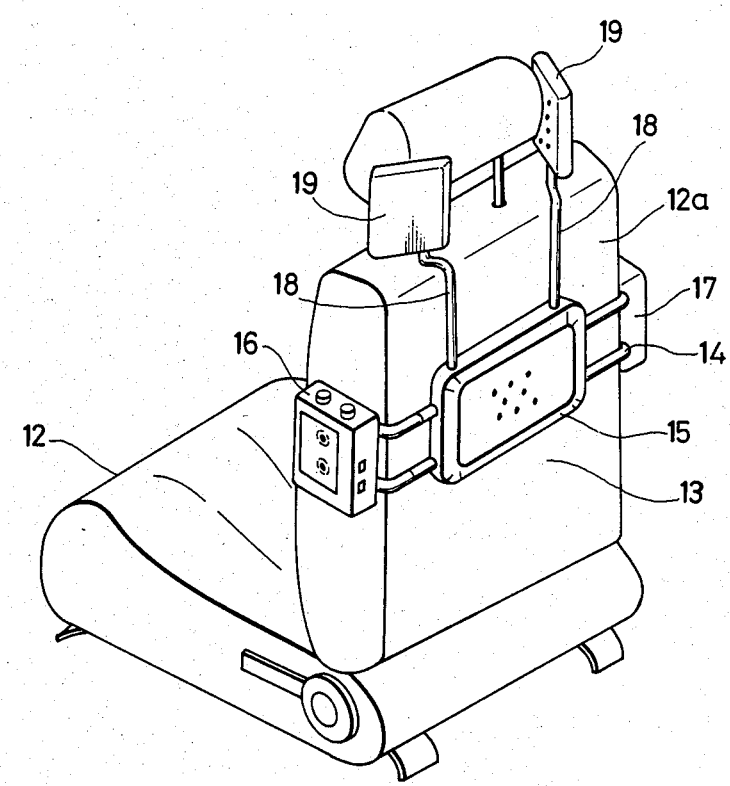
FIG. 8 is a perspective view showing an example of a spring-fixed body-sensible acoustic device according to the invention mounted on the back of a seat body.

In FIG. 8, reference numeral 12 designates a driver's or passenger's seat body in an automobile. The body-sensible acoustic device 13 according to the invention is mounted on the rear side of the back 12a of the seat body 12 utilizing side frames 12b (shown in FIGS. 12A and 12B) which are arranged on the right and left sides of the back 12a of the seat body 12.

Figure 9A:
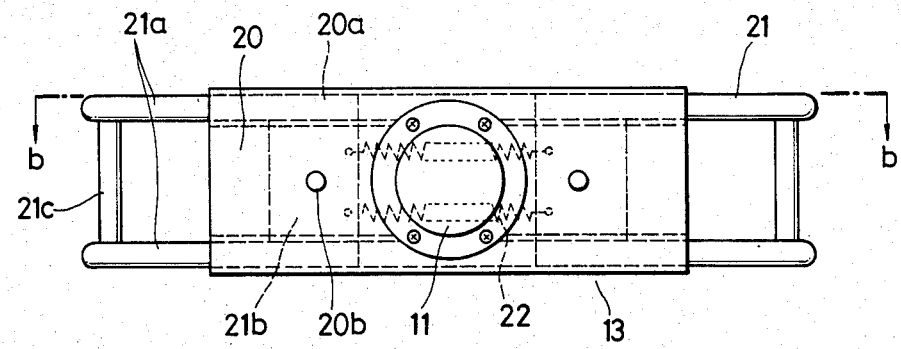
FIGS. 9A to 9C are a front view, a sectional view taken along line b—b in FIG. 9A, and a rear view, respectively, showing an example of the internal construction of the device shown in FIG. 8.
Figure 9B:
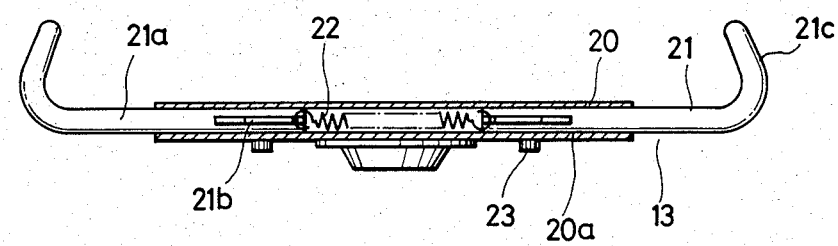
Figure 9C:
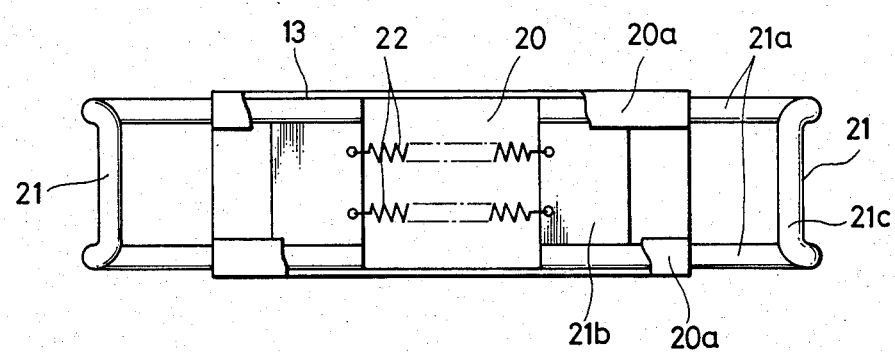

A specific example of the body-sensible acoustic device is as shown in FIGS. 9A to 9C. Further in FIG. 8, reference numeral 14 designates clamping members for mounting the drive unit 11 on the side frames 12b; 15, a cover adapted to cover the drive unit 11 to improve the external appearance of the drive unit and to protect persons sitting in the rear seat; 16, an acoustic source such as a tape recorder; 17, an acoustic element such as a volume or tone controller; 18, angle members connected to the clamping members 14; and 19, loudspeaker units mounted on the ends of the angle members 18.

The clamping structure for mounting the drive unit 11 on the side frames 12b will be described.

FIGS. 9A to 9C show an example of a clamping structure which utilizes the elastic force of spring members. In these figures, reference numeral 20 designates a vibration transmitting member of made metal and having pipe-shaped guides 20a which extend along the upper and lower edges forming clearances into which supporting plates 21b (described below) are inserted. The drive unit 11 is secured to the middle of the vibration transmitting member with screws. Reference numeral 21 designates a pair of clamping members made up of two parallel pipes 11a slidably inserted into the above-described guides 20a. The supporting plates 21b are secured to the inner end portions of the clamping members 21. The outer end portion of the clamping members 21 are bent to form arms 21c which are used to hold the side frames 12b of the back 21a. Spring members 22 such as coil springs are connected between the supporting plates 21b to pull the clamping members 21 towards each other. Screws 23 are screwed into threaded holes 20b and pushed against the supporting plates 21b so as to fix the clamping members 21.

The mounting the above-described body-sensible acoustic device on the back 12a will be described.

First, the screws 23 are loosened so that the clamping members 21 can move freely. Under this condition, the clamping member 21 are pulled away from each other against the elastic force of the spring members 22 by holding the arms 21c with the hands and are positioned on the rear side of back 12a in such a manner that the arm 21c hold the side frames 12b from behind. Under this condition, the arms 21c are released so that the spring member 22 pull the clamping members 21 toward each other to cause the arms 21c to firmly hold the side frames 12b.

Thus, the body-sensible acoustic device is mounted on the seat back 12a. When, under condition, the drive unit 11 is operated, the clamping members 21 may be made loose by the operation of vibration transmitting member 20. In order to eliminate this difficulty, the clamping members 21 are combined with the vibration transmitting member 20 by tightening the screws.

Thereafter, the covers 15 is installed. Thus, the body-sensible acoustic device is completely positively mounted on the back 12a.

In the above-described embodiment, the distance between the arms 21c can be changed as required, and therefore the device can be mounted on a variety of seat backs of different width.

When the drive unit 11 is driven, the vibration transmitting member 20 is vibrated by the drive unit 11. The vibration of the vibration transmitting member 20 is transmitted through the clamping members to the side frames 12b on the back 12a. Accordingly, the side frames 12b are vibrated and the whole back 12a is vibrated through the wavy springs FIGS. 12A and 12B which are connected between the side frames 12b. Thus, extremely low-frequency components are positively transmitted to the back of the person in the seat.

Figure 10A:
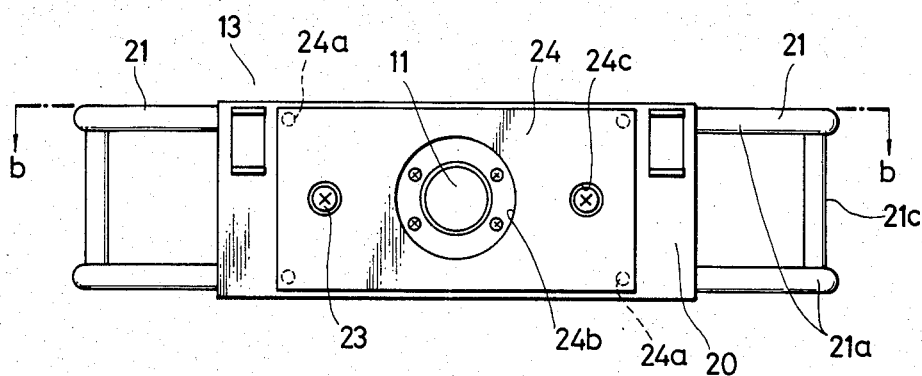
FIG. 10A is a front view showing another example of the internal construction of the device in FIG. 8.
Figure 10B:
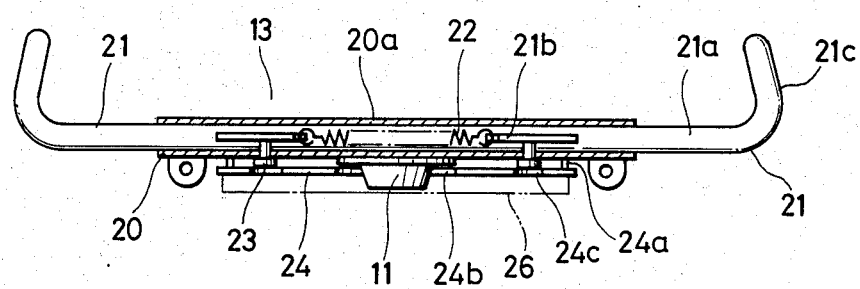
FIG. 10B is a sectional view taken along line b—b in FIG. 10A.
Figure 10C:
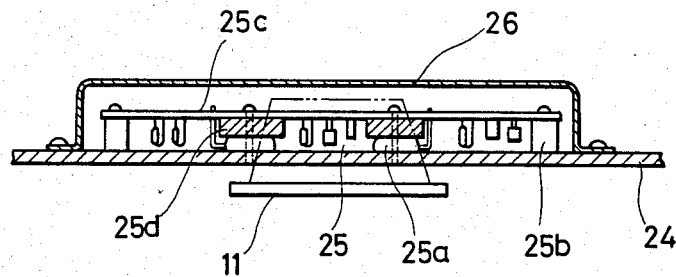
FIG. 10C is a plan view showing a circuit unit in the device.

FIGS. 10A to 10C another example of the device of the invention, which is obtained by adding a heat radiating plate 24 to the device shown in FIGS. 9A to 9C. The heat radiating plate 24 is used to radiate the heat of power transistors 25a in a power amplifer 25. The heat radiating plate 24 is made of heat conductive material, and it is installed through spacers 24a of heat conductive material on the vibration transmitting member 20. The heat radiating plate 24 has a through-hole 24b into which the drive unit 11 is inserted. The printed circuit board 25c of the power amplifier 25 is mounted through spacers 25b on the heat radiating plate 24. The power transistors 25a of the power amplifier 25 are pressed against the heat radiating plate 24 by elastic members 25d. The printed circuit board also has a through-hole to receive the drive unit 11. The heat radiating plate 24 has screwdriver insertion holes 25e at positions corresponding to the positions of the above-described screws 23. Reference numeral 26 designates a cover for the power amplifier.

In the case of FIGS. 10A to 10C, the power amplifier 25 for driving the drive unit 11 is built into the body-sensible acoustic device 13, and the heat of the power transistors 25a is radiated through the heat radiating plate 24, the spacers 24a and the vibration transmitting plate 20.

In the device shown in FIGS. 10A to 10C, U-shaped fittings 20c for receiving and supporting the angle members 18 (FIG. 8) are secured to the vibration transmitting member 20.

In the device of FIGS. 10A to 10C, the power transistors 25a are in contact with the heat radiating plate 24. However, the device may be modified so that the heat radiating plate 24 is eliminated.

Figure 11:
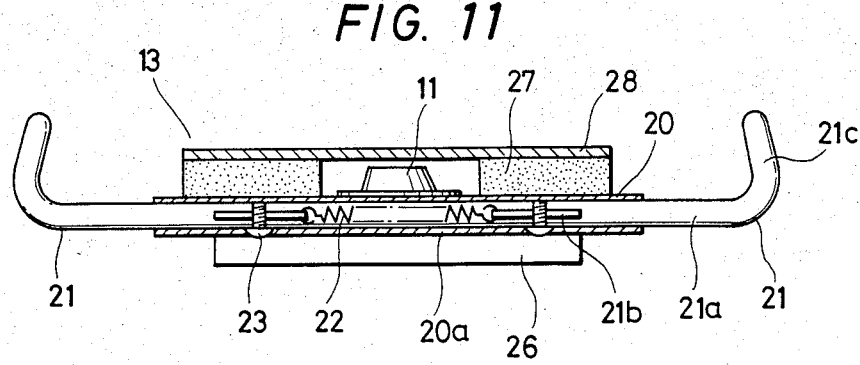
FIG. 11 is a sectional view showing a further example of the internal construction of the device of FIG. 8.

FIG. 11 shows a further example of the body-sensible acoustic device, which is obtained by mounting a contact plate 28 on the vibration transmitting member 20 of the body-sensible acoustic device shown in FIGS. 9A to 9C or 10A to 10C through an elastic member 27 made of relatively hard material such as rubber. The elastic member 27 has a through-hole 27a to receive the drive unit 11.

In the example shown in FIG. 11, when the device is mounted on the rear side of the seat back 12a utilizing the clamping members 21, the vibration transmitting member 20 is pressed against the back 12a through the elastic member 27 and the contact plate 28. Therefore, the vibration of the drive unit 11 is transmitted not only to the side frames 12b of the back 12a through the clamping members 21 as in the device shown in FIGS. 9A to 9C or 10A to 10C, but also to the rear side of the back 12a through the contact plate 28.

Figure 12A:
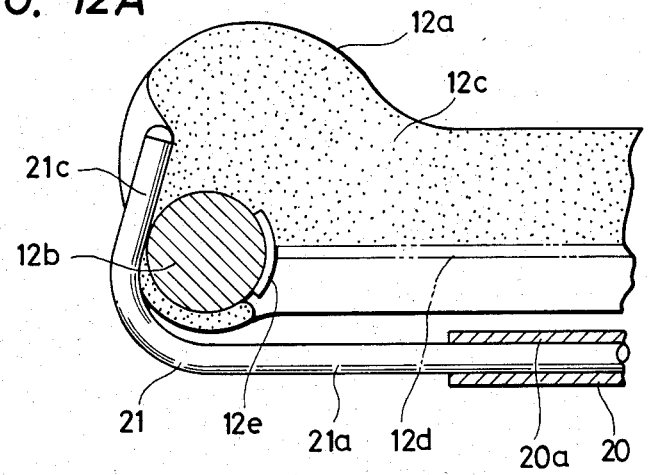
FIGS. 12A and 12B are plan views showing examples of an arm which is coupled to the side frame of a seat back.
Figure 12B:
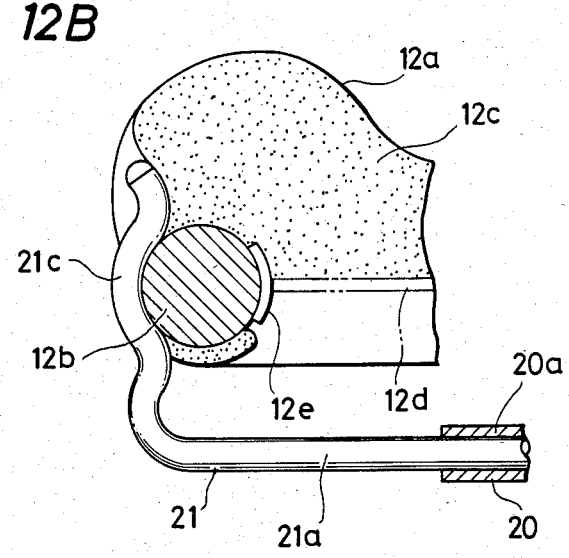

FIGS. 12A and 12B show a method of holding the side frames 12b of the seat back 12a with the arm 21c of the clamping members 21. In these figures, 12c designates a cushion material; and 12d, wavey springs connected between the side frames 12b using fixing members 12e. In FIG. 12A, the L-shaped arm 21c holds the side frame 12b through a part of the cushion material. Therefore, although the vibration transmitted to the clamping member 21 is further transmitted through the arm 21c to the side frame 12b, the transmission of the vibration is not so effective because the arm 21c is in point contact with the side frame 12b.

If the arm 21c is made S-shaped as shown in FIG. 12A, then the efficiency of transmission of the vibration is increased because the arm 21c is in line contact with the side frame 12b. In addition, the arm 21c can more firmly hold the side frame 12b, as a result of which the arm 21c cannot be disengaged from the side frame by vibration or the like.

Other examples of the device in which the clamping structure is secured with screws will be described with reference to FIGS. 13A to 14B.

Figure 13A:
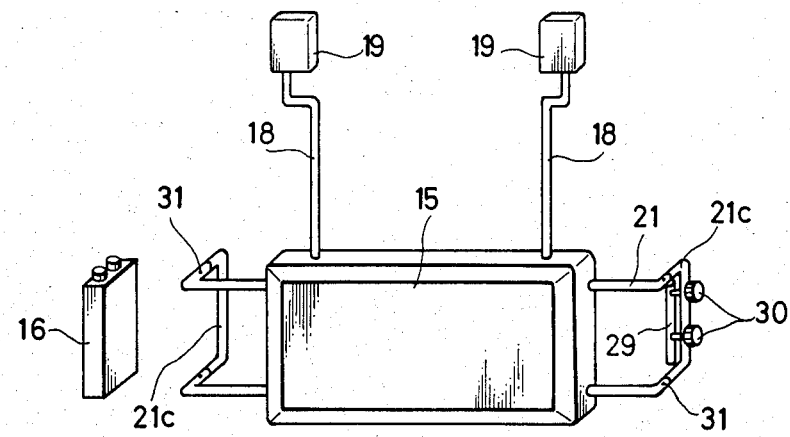
FIGS. 13A and 13B are a perspective view and a plan view, respectively, showing an example of a screw-fixed body-sensible acoustic device according to the invention.
Figure 13B:
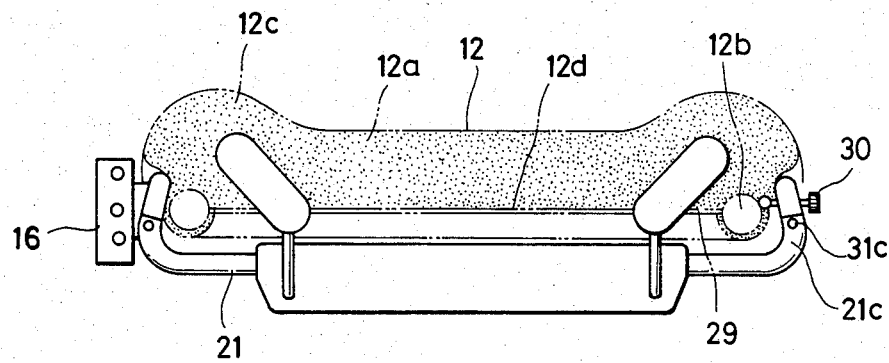

In the example shown in FIGS. 13A and 13B, two fixing screws 29 are screwed into one of the assemblies of the arms 21c of the clamping members 21, and one pressure plate 30 is freely mounted on the ends of the fixing screws 29. Each arm 21c is made up of two parts so that the length of the arm 25c can be adjusted by turning a screw 31.

The body-sensible acoustic device 13, like the one shown in FIGS. 9A to 9C, includes the vibration transmitting member 20, the drive unit mounted on the vibration transmitting member 20, and the clamping member 21 which is slidable with respect to the vibration transmitting member and which can be secured to the latter. The drive unit is covered with a cover 15. In FIGS. 13A and 13B, reference numeral 16 designates an acoustic element, and 19, loudspeaker units provided on the tops of the angle members 18 installed on the vibration transmitting member 20.

The distance between the arms 21c of the clamping members 21 is made equal to the width of the seat back 12a, and the screws 41 are turned so that the pressure plate 30 is positioned before the side frame 12b of the back 12a (as shown in FIG. 9B). With the device positioned on the rear side of the back 12a, the screws 29 are tightened, as a result of which the clamping members 21 hold the side frames 12b of the back 12a. The vibration of the drive unit 11 is transmitted through the vibration transmitting member 20 and the clamping members 21 to the side frames 12b, and therefore the whole back 12b is vibrated through the wavy springs 12d.

Figure 14A:
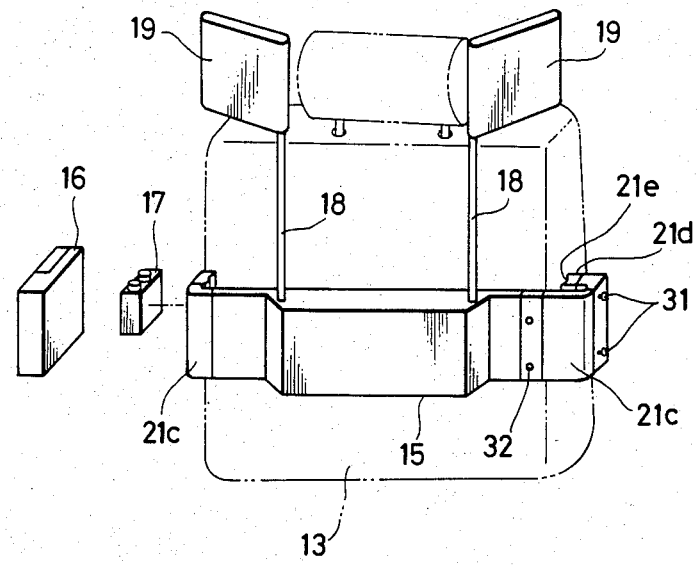
FIGS. 14A and 14B are a perspective view and a plan view, respectively, showing another example of the screw-fixed body-sensible acoustic device according to the invention.
Figure 14B:
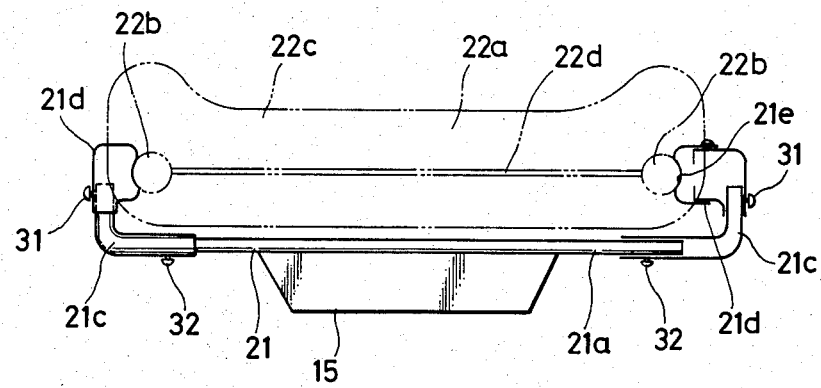

In the example shown in FIGS. 14A and 14B, plate-shaped arms 21c are employed. The arms 21c are engaged with the pipes 21a with screws 32 so that the distance between the arms 11c can be adjusted. Each arm 21c has a box-shaped end part 21d which is connected to its end portion with screws 31 so that the box-shaped end part 21d can be displaced back and forth. A groove 21e for snugly receiving the pipe-shaped side frame 12b is formed in the surface of each box-shaped end part 21d which confronts the side frame 12b.

The screws 31 are operated to adjust the positions of the box-shaped end parts 21d of the arms 21c of the clamping members 21 according to the thickness of the back 12a so that the grooves 21e in the box-shaped end parts 21d can receive the pipe-shaped side frames 12b. The distance between the arms 11c is adjusted by turning the screws 32 to cause the groove 21e in the box-shaped end parts 21d to receive the side frames 12b, and then the screws 32 are tightened. Thus, the device has been fixedly mounted on the seat back 12a.

The vibration of the drive unit is transmitted in the same manner as in the above-described example of the device.

As is apparent from the above description, in the device according to the invention, the vibration transmitting member to which the drive unit has been secured is fixedly mounted on the side frames of the seat back by means of the clamping members, as a result of which the vibration of the drive unit is transmitted through the vibration transmitting member and the clamping members to side frames such that the seat back is positively vibrated in its entirety, thus transmitting extremely low-frequency sounds to the back of the person in the seat. In addition, it is another merit of the device that it can be detachably mounted on the seat back with ease.

Figure 15A:
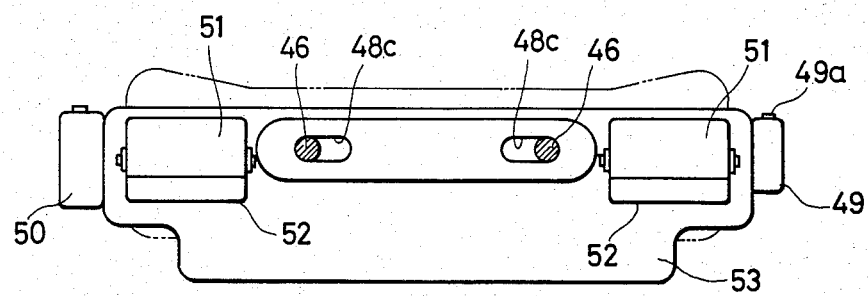
FIGS. 15A to 15C are, respectively, a plan view, a rear view and a sectional side view showing another example of the installation of the device on the back of a seat body.
Figure 15B:
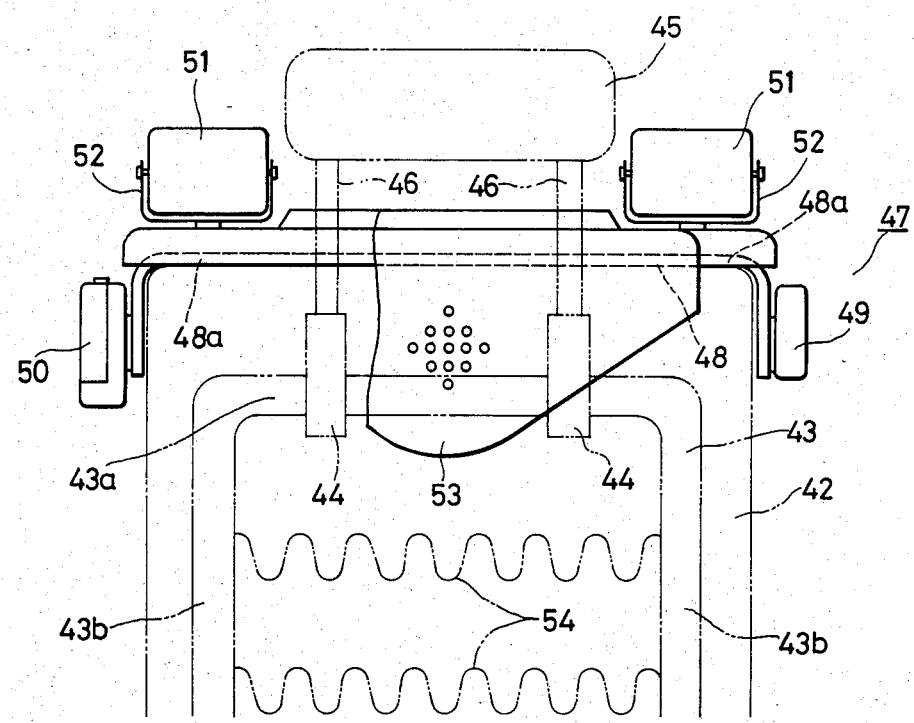

Other embodiments of a device for mounting a drive unit 1 on the back of a seat body of an automobile will be described with reference to the FIGS. 15A to 15C.

Figure 15C:
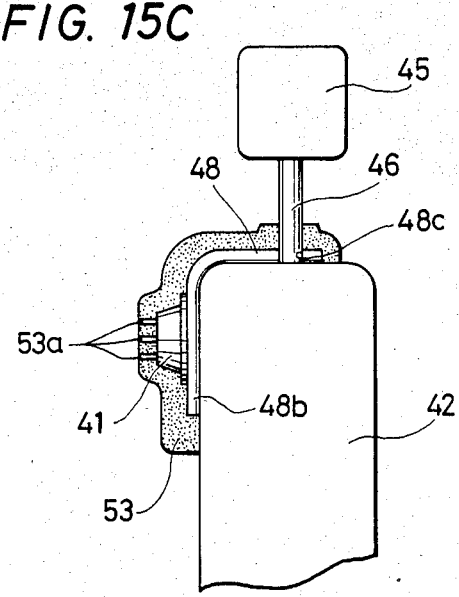

In FIG. 15C, reference numeral 42 designates the back of a driver's or passenger's seat body of an automobile. Two mounting pipes 44 are connected to the upper pipe 43a which is a part of the pipe frame 43 which is provided in the back 42 of the seat body. A pair of legs 46 of a head rest 45 are inserted into the mounting pipes 44. The body-sensible acoustic device 47 of the invention is mounted utilizing these legs 46.

The body-sensible acoustic device 47 is made up of the drive unit 41 mounted through the legs 46 on the back 42, a control section 49, a tape recorder 50, and loudspeaker units 51.

A vibration transmitting member 48 includes arms 48a and 48a which extend along the upper edge of the back 42 and are bent downwardly at both ends of the upper edge of the back substantially at right angles, and a mounting piece 48b extending along the rear side of the back 42 of the seat body. The control section 49 and the tape recorder are mounted on the portions of the arms 48a which extend downwardly (along the two sides of the back 42). The loudspeaker units 51 are rotatably mounted through substantially U-shaped supporting frames 52 on the portions of the arms 48a which are located on both sides of the head rest 45 (and are not contacted by the body of the person in the seat). The drive unit 41 is secured to the mounting piece 48b with screws.

Elongated mounting holes 48c are formed in the middle of the vibration transmitting member 48. The vibration transmitting member 48 is mounted on the upper edge of the back 42 by detachably inserting the legs 46 into the mounting holes 48c. The distance between the mounting holes 48c is slightly shorter than that between the legs 46 so that the legs 46 are abutted against the walls of the mounting holes 48c under pressure, i.e., the legs 46 have no play in the mounting holes 48c.

The control section 49 is used to control the vibration of the drive unit 41.

The vibration transmitting member 48 and the drive unit 41 are covered with a cover member 53 of synthetic resin in order to protect persons sitting in the rear seat and to improve the external appearance of the assembly. A number of ventilation holes 53a for heat radiation are formed in the portion of the cover member 53 which is used to cover the drive unit 41.

The power wires (not shown) of the drive unit 41, the control section 49, the tape recorder 50, and the loudspeaker units 51 are connected to a common connector. They can be energized by connecting the common connector to a cigarette lighter outlet provided on the dashboard.

The drive unit 41 may be mounted between the mounting holes 48c. In this case, the mounting piece 48b can be eliminated.

The body-sensible acoustic device 47 is mounted on the back 42 of the seat body as follows: First, the head rest 45 is removed from the back 42. Under this condition, the vibration transmitting member 48 is set on the top of the back 42. The legs 46 are inserted through the mounting holes 48c into the mounting pipes 44 with the distance between the legs 46 slightly reduced, and then the head rest 45 is put back. Thus, the body-sensible acoustic device 47 is mounted on the top of the seat back 42. The body-sensible acoustic device 47 can be replaced or removed by pulling the legs 46 out of the mounting pipes 44 through the mounting holes 48c.

The vibration transmitting member 48 is vibrated by driving the drive unit 41. The vibration of the vibration transmitting member 48 is transmitted through the legs 46 to the pipe frame 43 to vibrate the latter, as a result of which spring members connected between the right and left pipe members are vibrated and the seat back 42 is vibrated in its entirety. At the same time, musical sounds are produced by the right and left loudspeaker units 51, and the person in the seat senses extremely low-frequency components of the musical sound through his body. The strength of vibration can be adjusted by operating the knob 49a of the control section 49.

As is apparent from the above description, according to the invention, the vibration transmitting member with the drive unit is mounted on the seat back utilizing the legs of the head rest. Therefore, it is unnecessary to modify the seat, the user can readily mount and remove the device, and the device can be mounted on a variety of vehicles. The device of the invention, unlike one which is built inside a seat back, does not adversely affect the comfort of the seat.

The vibration of the drive unit is transmitted through the vibration transmitting member, the head rest's legs and the frame to the seat back, as described above. Therefore, the whole seat back is positively vibrated, and the person in the seat can feel extremely low-frequency sounds through his body.

The control section, the tape recorder and the loudspeaker units are mounted on the arms of the vibration transmitting member extending along the upper edge of the seat back; that is, these acoustic elements are collectively arranged on the seat back. Therefore, the power lines of the drive unit and the acoustic elements can be connected to a common connector. Accordingly, the drive unit and the acoustic elements can be readily energized by connecting the common connector to a cigarette lighter outlet or the like. Furthermore, the person in the chair can adjust the level of low-frequency sounds.

Another embodiment of a device for mounting a drive unit 1 on the rear side of the back of a seat body of an automobile will be described with reference to FIG. 16.

Figure 16:
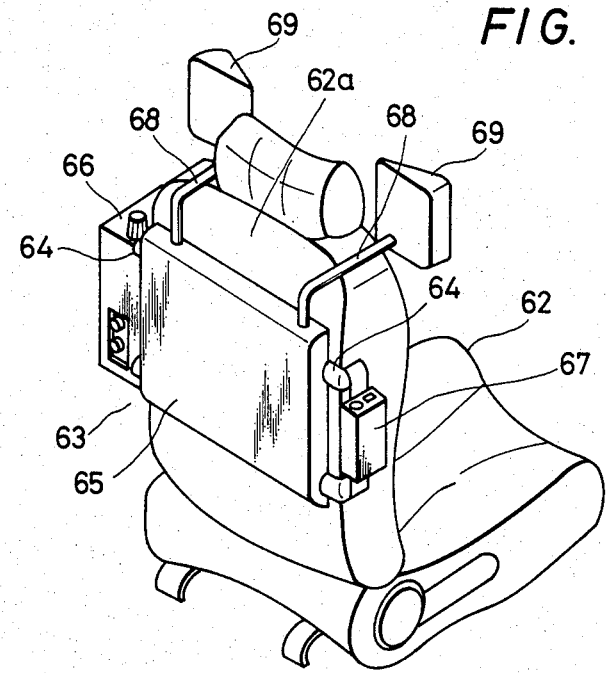
FIG. 16 is a perspective view showing an example of a spring-fixed body-sensible acoustic device according to the invention mounted on the back of a seat body.

In FIG. 16, reference numeral 62 designates a driver's or passenger's seat body of an automobile. The body-sensible acoustic device 63 according to the invention is mounted on the rear side of the back 62a of the seat body 62 utilizing side frames 62b (shown in FIGS. 20A and 20B) which are arranged on the right and left sides of the back 62a of the seat body 62.

Figure 17A:
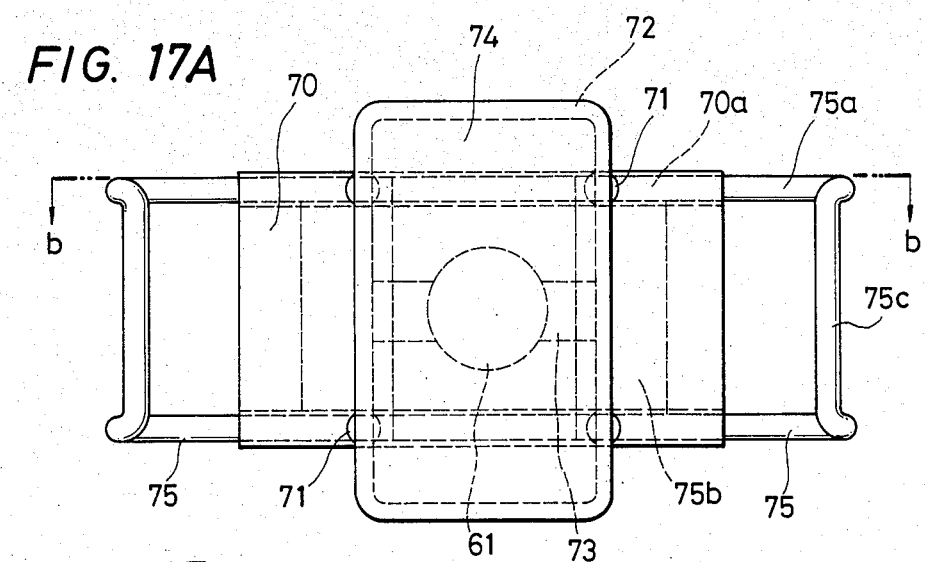
FIGS. 17A to 17C are a front view, a sectional view taken along a line b—b in FIG. 17A, and a rear view, respectively, showing an example of the internal construction of the device showing in FIG. 16.
Figure 17B:
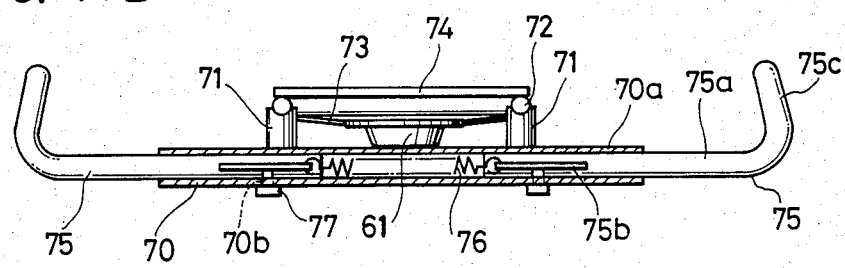
Figure 17C:
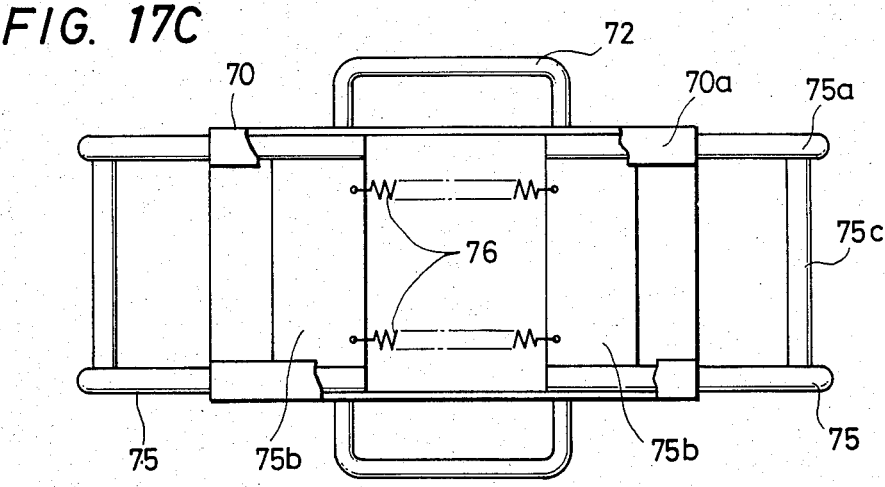

A specific example of the body-sensible acoustic device is as shown in FIGS. 17A to 17C. Further in FIG. 16, reference numeral 64 designates clamping members for mounting the drive unit 61 on the side frames 62b; 65, a cover adapted to cover the drive unit 61 to improve the external appearance of the drive unit and to protect persons sitting in the rear seat; 66, an acoustic source such a tape recorder; 67, an acoustic element such as a volume or tone controller; 68, angle members connected to the clamping members 64; and 69, loudspeaker units mounted on the ends of the angle members 68.

A clamping structure for mounting the drive unit 61 on the side frames 62b will be described.

FIGS. 17A to 17C depict an example of the clamping structure which utilizes the elastic forces of spring members. The construction of a planar drive unit mounted on the clamping means will be described. Reference numeral 70 designates a mounting member having pipe-shaped guides 70a extending along its upper and lower edges. The guides 70a have clearances into which supporting plates 75b (described below) are inserted. A plurality of legs 71 of rubber or the like are bonded to the middle portions of the guides 70a with adhesive or the like. A rectangular frame 72 is bonded to the legs 71 with adhesive or the like. A supporting arm 73 is fixedly connected between two opposed sides of the rectangular frame 72 which are on the legs 71. The drive unit 71 is secured to the supporting arm 73 with screws. Reference numeral 74 designates a vibration transmitting member which is fixedly provided on the front side of the frame 72. The vibration transmitting member 74 thus provided is abutted through the cover against wavy springs (not shown) connected between the side frames 62b in the seat back 62a.

The construction of the clamping structure for mounting the planar drive unit of the seat back 62a will be described. Reference numeral 75 designates a pair of clamping members whose parallel pipes are slidably inserted into the pipe-shaped guides 70a. The supporting plate 75b is fixedly secured to the inner end portions of each clamping member. The outer end portion of each clamping member is bent to form an arm 75c. The arms 75c of the clamping members 75 are used to hold the side frames 62b of the seat back 62a. Reference numeral 76 designates a pair of coil springs connected between the supporting plates 75b so that the latter are pulled towards each other at all times. 70b designates threaded holes into which screws 77 are screwed to fixedly hold the clamping members 75.

The mounting the above-described body-sensible acoustic device 63 on the seat back 62a will be described.

First, the screws 77 are loosened so that the clamping members 75 can move freely. Under this condition, the clamping members 75 are pulled away from each other against the elastic force of the springs 76 by holding the arms 75c with the hands and are positioned on the rear side of the seat back 62a in such a manner that the arms 75c hold the sides frames 62b. Under this condition, the arms 75c are released. As a result, the springs 76 pull the clamping members 75 towards each other to cause the arms 75c to firmly hold the side frames 62b. As the planar drive unit protrudes a considerable distance from the front surface of the mounting member 70, when the mounting member 70 is mounted on the seat back 62a, the vibration transmitting member 74 is abutted against the wavy springs through the seat cover under pressure. Under the condition that the clamping members clamp the side frames with the aid of the elastic force of the springs 76, the screws 77 are tightened. Accordingly, the vibration of the automobile is prevented from causing the clamping members 75 to come off the side frames 62b of the seat back 62a. Thereafter, the cover 65 is installed. Thus, the body-sensible acoustic device is mounted on the seat back 62a.

In the above-described embodiment, the distance between the arms 75c of the clamping member 75 can be changed freely. Therefore, the device can be mounted on a variety of backs of different width.

When the drive unit 61 is vibrated by acoustic signals, the vibration of the drive unit is transmitted to the supporting arm 73 to vibrate the latter, as a result of which the frame 72 is vibrated, and the wavy springs provided in the seat back 62a are vibrated through the vibration transmitting member 74. Thus, the entire back 62a is positively vibrated so that extremely low-frequency sounds are transmitted to the person in the seat.

Other embodiments of the invention in which the clamping structure utilizes screws will be described with reference to FIGS. 18, 19A and 19B, and 20A and 20B.

Figure 18:
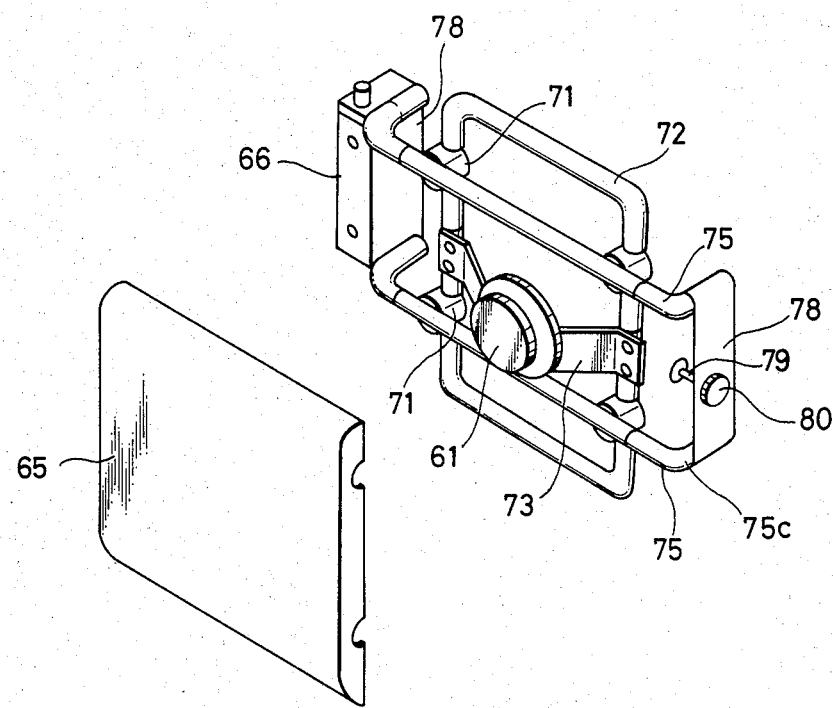
FIG. 18 is an exploded perspective view showing an example of a screw-fixed body-sensible acoustic device according to the invention which is mounted on a seat back.

In the embodiment shown in FIG. 18, instead of the mounting member 70 shown in FIGS. 17A to 17C, two pipe-shaped clamping members 75 are employed. Both end portions of each clamping members 75 are bent to form arms 75c, and a fixing plate 75 is fixedly secured to the arms 75c thus formed. A threaded hole is formed in one of the fixing plates 78, and a fixing screw 80 having a pressure plate 79 on one end is screwed into the threaded hole. Two legs 71 are fixedly secured to each of the clamping members 75, and a frame 72 having a supporting arm 73 is fixedly mounted on the legs 71. The drive unit 61 is mounted on the supporting arm 73.

In the embodiment shown in FIG. 18, no vibration transmitting member (74) is used, and the frame 72 is directly pressed against the wavy springs of the seat back 62a. In FIG. 18, reference numeral 65 designates a cover, and 66, an acoustic element.

With the clamping members 75 positioned on the rear side of the seat back 62a, the fixing plate 76 which has no fixing screw (80), namely, the left-hand fixing plate 76 which has the fixing screw 80, is positioned beside the right-hand side frame 62b. Under this condition, the fixing screw 80 is tightened so that the pressure plate 71 on the end presses the side frame 62b.

Thus, the planar drive unit is mounted on the rear side of the seat back 62a through the clamping members, and the the frame 72 pressed against the wavy springs. Accordingly, as in the above-described cases, the vibration of the drive unit 61 is transmitted to the wavy springs and the entire seat back 62a is vibrated.

Figure 19A:
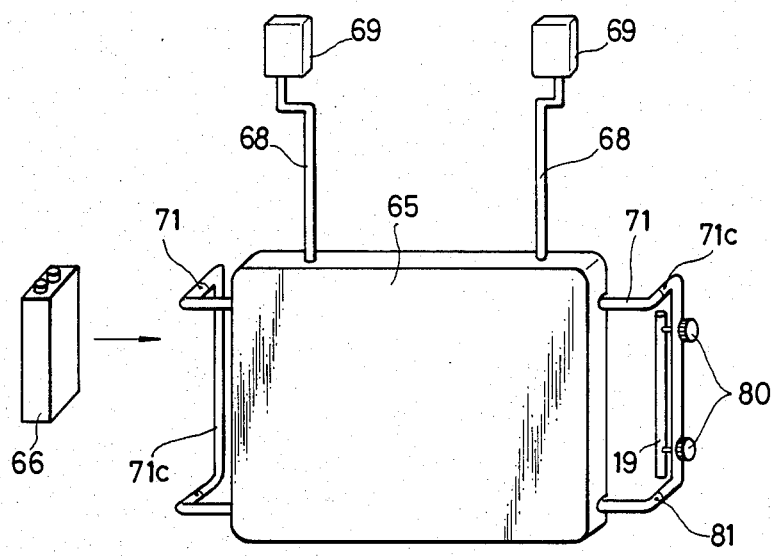
FIGS. 19A and 19B are, respectively, a perspective view and a plan view showing another example of the device of FIG. 16.
Figure 19B:
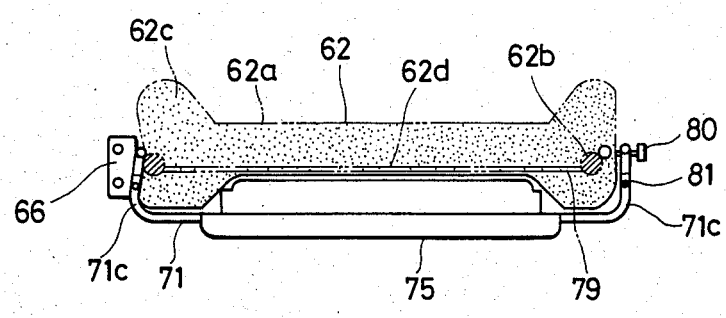

In the embodiment shown in FIGS. 19A and 19B, two fixing screws 80 are screwed into one of the above-described fixing plates 78, and one pressure plate 79 is freely mounted on the ends of the fixing screw 80. Each arm 75c is made up of two parts so that the length of the arm 75c can be adjusted by tightening a screw 81.

In the embodiment shown in FIGS. 19A and 19B, a planar drive unit mounted on the clamping members 75 is the same as that shown in FIGS. 17A to 17C. In FIGS. 19A and 19B, reference numeral 65 designates a cover; 66, an acoustic element; and 69, loudspeaker units mounted on the ends of angle members 68 which are secured to the clamping members 75.

The distance between the arms 75c of the clamping members 75 is made equal to the width of the seat back 62a, and the screws 71 are turned so that the pressure plate 79 is positioned before the side frame 62b of the seat back 62a (FIG. 19B). With the device positioned on the rear side of the seat back 62a, the fixing screws 80 are tightened, as a result of which the clamping members 75 hold the side frames 62b of the seat back 62a. In this embodiment also, the planar drive unit is pressed against the wavy springs, and therefore when the drive unit 61 is vibrated, the entire seat back 62a is positively vibrated.

Figure 20A:
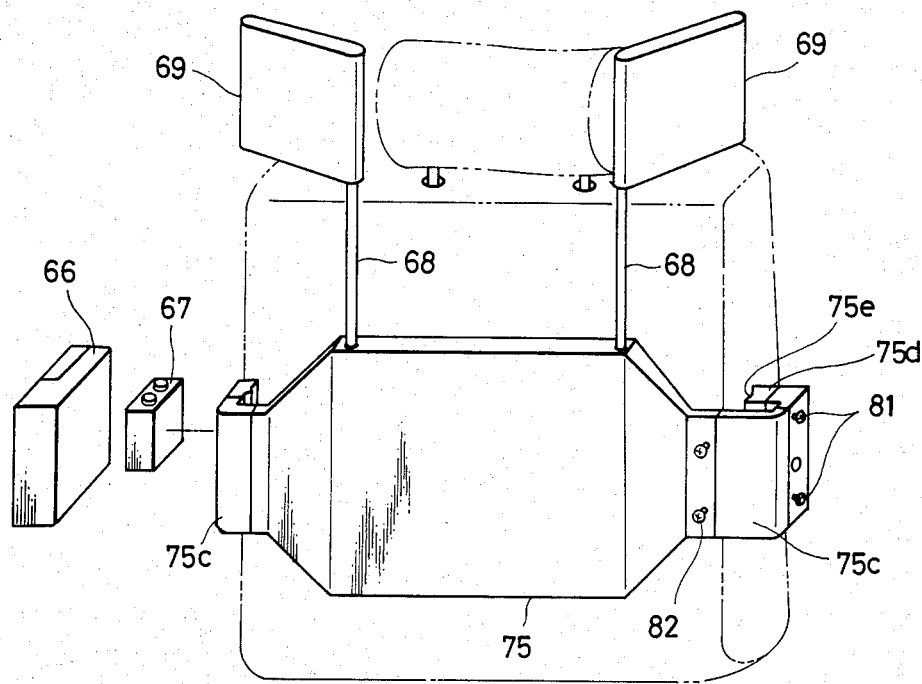
FIGS. 20A and 20B are, respectively, a perspective view and a plan view showing a still further example of the device of FIG. 16.
Figure 20B:
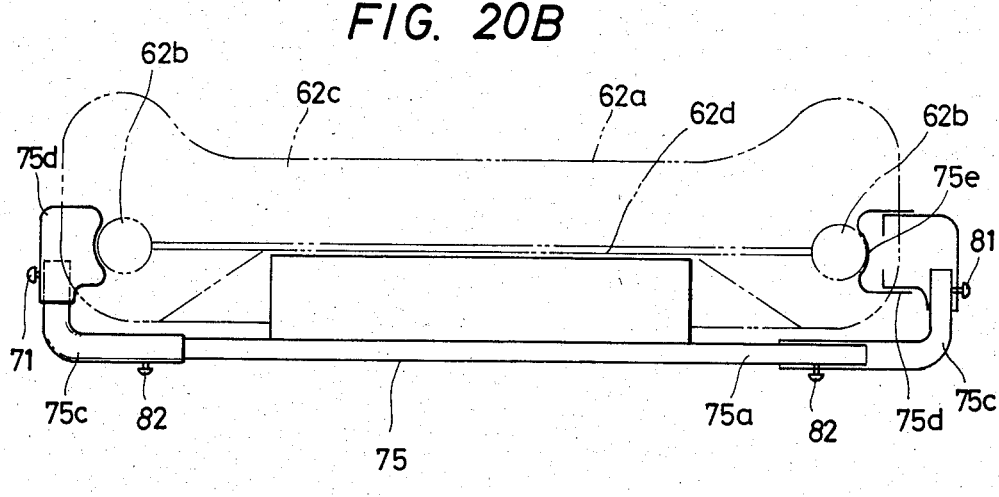

In the embodiment shown in FIGS. 20A and 20B, plate-shaped arms 75c are employed. The arms 75c are engaged with the pipes 75a with screws 82 so that the distance between the arms 75c can be adjusted. Each arm 75c has a box-shaped end part 75d which is connected to its end portion with screws 81 so that the bos-shaped end part 75d can be displaced back and forth. A groove 75e for snugly receiving the pipe-shaped side frame 62b is formed in the surface of each box-shaped end part which confronts the side frame 62b.

The screws 81 are operated to adjust the positions of the box-shaped end parts 75d of the arms 75c of the clamping members 75 according to the thickness of the seat back 62a so that the grooves 75e in the box-shaped end parts 75d can receive the pipe-shaped side frames 62b. The distance between the arms 75c is adjusted by operating the screws 82 to cause the grooves 75e in the box-shaped end parts 75d to receive the side frames 62b, and then the screws 82 are tightened. Thus, the device has been fixedly mounted on the chair's back 62a. The vibration of the drive unit is transmitted in the same manner as in the above-described embodiments.

As is apparent from the above description, according to the invention, the vibration unit mounted through the clamping members on the back of the seat body is pressed against the wavy springs of the seat back through the vibration transmitting member. Therefore, the entire seat back is vibrated, and the person in the seat can perceive extremely low-frequency sounds through his body. In addition, the body-sensible acoustic device of the invention can be readily mounted. As the drive unit is mounted through the elastic member on the clamping members, the degree of transmission of the vibration to the clamping member is relatively small, and accordingly the clamping member cannot be loosened by vibration.

I claim:

1. A body-sensible acoustic device, comprising:
   a drive unit which is driven by acousto-electrical signals;
   a vibration transmitting member on which said drive unit is mounted; and
   a pair of clamping members which are coupled to said vibration transmitting member in such a manner as to be slidable with respect to said vibration transmitting member and swingable in a plane including said vibration transmitting member, each clamping member having an arm for holding a side frame provided in a seat body.

2. A body-sensible acoustice device, comprising:
   a drive unit driven by acousto-electrical signals;
   a vibration transmitting member on which said driven unit is mounted; and
   clamping members adapted to detachably mount said vibration transmitting member on side frame of a back of a seat body of an automobile seat, said clamping members also being adapted to promote transmission of vibration from said transmitting member to said frame.

3. The device as claim in claim 2, wherein said clamping members are slidably mounted on said vibration transmitting member, and further comprising means for applying an elastic force to cause said clamping members to firmly hold said side frames.

4. The device as claimed in claim 2, wherein said clamping members are slidably mounted on said vibration transmitting member, and further comprising screws for firmly securing said clamping members to said vibration transmitting member to hold said side frames.

5. A body-sensible acoustic device, comprising:
   a vibration transmitting member which is detachably mounted on legs of a head rest which are fixedly inserted into a frame provided in a back of a seat body, said vibration transmitting member having arms exending along an upper surface of said back;
   a drive unit mounted on said vibration transmitting member and driven by acousto-electrical signals;
   acoustic elements, including at least one of a control section for said drive unit and a tape recorder, mounted on said arms of said vibration transmitting member; and
   a pair of loudspeaker units mounted on said arms of said vibration transmitting member in such a manner that said loudspeaker units are on both sides of said head rest.

6. A body-sensible acoustic device, comprising:
   a planar drive unit including a drive unit drive by acousto-electrical signals, and a vibration transmitting member pressed against a rear side of a back of a seat on which said drive unit is mounted; and
   clamping members on which said planar drive unit is mounted through an elastic member and which are detachably mounted on said frames of said back.

7. The device as claimed in claim 6, wherein said clamping members are so mounted as to be vibrated by said vibration transmitting member, and further comprising means for applying an elastic force to cause said clamping members to hold said side frames.

8. The device as claimed in claim 6, wherein said clamping members are so mounted as to be vibrated by said vibration transmitting member, and further comprising screws for securing said clamping members to said vibration transmitting member to hold said side frames.

* * * * *